Oct. 15, 1946. M. DOBKOWSKI 2,409,550
ELECTRODE FOR SPOT WELDING
Filed Dec. 4, 1944
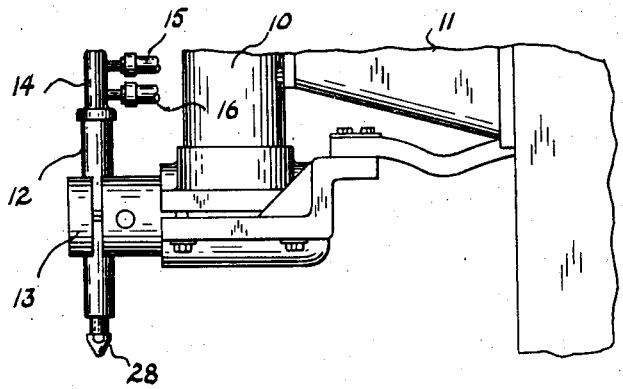
FIG-1-
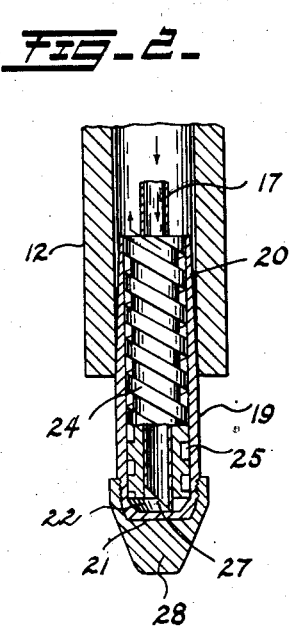
FIG-2-
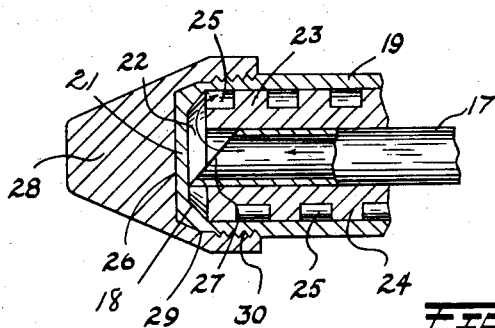
FIG-3-
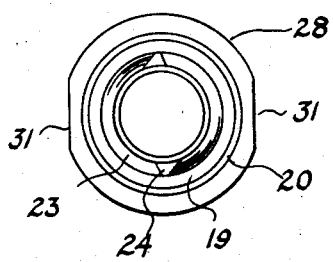
FIG-4-
INVENTOR.
MATTHEW DOBKOWSKI
BY
Louis Chayka
ATTORNEY.

Patented Oct. 15, 1946

2,409,550

UNITED STATES PATENT OFFICE 2,409,550

ELECTRODE FOR SPOT WELDING

Matthew Dobkowski, Detroit, Mich.

Application December 4, 1944, Serial No. 566,528

4 Claims. (Cl. 219—4)

1

The electrode of my invention pertains to the type which, being made of metal, is provided with means permitting circulation of a liquid through its body for the purpose of absorption of heat by said liquid in order that the body of the electrode, during its operative use, may be cooled off. A number of such electrodes are already known in trade, but as the size of the electrode has to be kept within certain practical limits and as the area for transfer of heat, generated during the operation of the electrode, is likewise restricted, various attempts have been made to increase said area. My own invention is directed to the same object, my purpose being to increase said heat transfer area to a very material extent, without at all increasing the electrode in size or departing too radically from its conventional construction. This I have accomplished by novel means and by a new combination of parts, which I shall now describe with reference to the accompanying drawing, in which:

Fig. 1 is a side elevation of a part of a welding machine including my electrode.

Fig. 2 is a vertical sectional view of my electrode, greatly enlarged, and the vertical sectional view of the lower part of the holder in which the electrode is disposed.

Fig. 3 is an enlarged sectional view of the operative end of my electrode, for the purpose of more clearly showing its operative parts.

Fig. 4 is the view of the open end of the electrode.

Similar numerals refer to similar parts throughout the several views.

In Fig. 1, I am showing only a part of a welding machine and only one electrode, although it will be understood that two such electrodes, one being opposed to the other, are ordinarily employed. As my disclosure is confined to the construction of the electrode, reference to the construction of the welding machines and to the location of said electrode will be more or less incidental. The part of the welding machine shown in Fig. 1 includes a head 10, carried by an arm 11, which is adapted for vertical movement, and a holder 12 for the support of an electrode. The holder is tubular in form and is held in place by means of a clamp 13. At the upper end, the holder is provided with a hollow hood 14, provided with two nipples for connection of pipe lines 15 and 16, respectively. One of said pipes serves to convey a cooling liquid into the hood and towards the electrode by means of a tube 17 disposed within said holder, while the other pipe serves to carry said liquid out of the hood on its

2 way out of the electrode. As the manner of inserting the electrode into the holder and connecting it to the pipes supplying a cooling liquid to the electrode, is well known, a more specific description of these features is omitted herein.

The electrode comprises a cylindrical metal shell 19, open at one end and having a wall which tapers towards that end as shown by numeral 20. This is for the purpose of easy insertion of the shell into the mouth of the lower end of the holder, wherein the electrode is held frictionally. At the opposite end the shell is closed by a thin transverse wall 21. Internally the shell is of uniform diameter throughout its length, with the exception of the part adjoining the end wall 21, where the diameter is stepped down, that part resulting in a dish-like formation 18. This serves a purpose which will be presently explained. Axially disposed within said shell 19 is a member 23, the outer surface of which is provided with a spiral groove 25 while the intervening area between the coils of the groove results in the formation of a rib 24. Said member 23 is of a diameter to insure a tight fit into said shell 19, so that the surface of the rib, which is as wide at the top as it is at the base, is in a frictional contact with the inner wall of shell 19. As the lower part of said shell is of reduced diameter, as indicated above, member 23 cannot reach wall 21 of shell 19, so that a free space 22 is left between the inner end of member 23 and said wall. An axial opening in member 23 is occupied by a tube 17, fitting tightly into said passage and extending through said passage to the end wall 21. The inner end of the tube is cut off diagonally as indicated by numeral 27.

The operative end of the electrode, that is the end which extends from holder 12, is threaded at 30 for the application of a replaceable cap 28, being correspondingly threaded on inside. The cap has flattened sides 31 for application of a wrench, should it be necessary to remove the cap from the body of shell 19.

When the electrode is in its place in holder 12, water or some other cooling liquid may be admitted to the electrode from pipe 15 through tube 17. Delivered into the electrode under pressure, the liquid will reach the end of said tube, enter space 22, wherefrom, on its way back, it will enter groove 25 and spiral its way upwardly between individual coils of rib 24, into holder 12. From the holder, it will be carried out by means of pipe 16.

What is accomplished by this particular construction is the following: Heat generated during the operation of the electrode, by the electric current passing through it, is readily transmitted from shell 19 to rib 24 and to the body of member 23, of which the rib is a part. The heat transfer area, instead of being confined to the inner wall of shell 19, is extended to said rib and to the remaining outer surface of member 23. In addition thereto, water or other cooling liquid, which ordinarily would rush back to the outlet pipe at the top of holder 12, is made to circulate around the spiral rib 24, so that a given volume of water may absorb much more heat than would be possible by a fleeting contact of the liquid with the inner surface of shell 19.

As indicated above, my electrode includes a replaceable cap 28. In case the cap is damaged in operation, it may be readily replaced by another without the need of discarding the whole electrode. Because of the fact that the shell of the electrode is closed at its operative end, the cap may be replaced at any time without discontinuing circulation of the cooling liquid within shell 19. The cap, it will be noted, has a socket 29 including a broad contact surface 26 bearing against the thin, transverse wall 21 of shell 19. The arrangement makes it possible for heat generated in the cap at the operative end of the electrode, to be easily conveyed to the shell and by means of rib 24 to member 23 within the shell for absorption therefrom by the cooling liquid.

It will be understood that some changes in the shape of the elements entering into construction of my electrode, and their combination, may be made without on the whole departing from the inventive principle underlying my invention. What I, therefore, wish to claim is as follows:

1. An electrode of the kind described, comprising a thin cylindrical shell, closed at one end by a transverse wall, an elongated member axially disposed within said shell, having an axial passage therein and having a spiral groove on its outer surface, the inner end of the member terminating short of said transferse wall, to leave a free space adjoining said wall, the axial passage in said member serving to convey cooling liquid to the said free space, while the groove affords an outlet for said liquid from said shell.

2. A spot welding electrode of the kind described, comprising a thin cylindrical shell, closed at one end by a thin transverse wall, a cylindrical member having an axial passage therein, disposed in the shell in a frictional contact with the inner wall thereof, and terminating short of said transverse wall, to allow free space adjoining said wall, said member being provided with a groove on its outer surface spiralling along its length, the axial passage in the groove member serving to convey liquid to said free space, while the groove serves as an outlet therefrom, and a replaceable cap at the operative end of the electrode.

3. In combination with a hollow holder and supply means of a cooling liquid, an electrode of the kind described, comprising a cylindrical shell, closed at one end by a thin transverse wall, the shell being of uniform inner diameter, with the exception of a portion adjoining said wall, where the diameter is reduced, an elongated bracing member having an axial opening therein, said member being disposed within the shell and extending inwardly to the reduced diameter portion of the shell, leaving a free space adjoining said transverse wall, the outer surface of the member abutting the inner surface of the shell, but leaving a spiral groove along its length, the inner passage of the elongated member serving to accommodate a tube for introduction of liquid into the electrode, while the spiral groove permits the return flow of said liquid from the electrode, and a replaceable cap at the operative end of said electrode.

4. An electrode of the kind described, comprising a hollow shell, closed at one end, an elongated member having an axial passage therein and a spiral groove on its outer surface, the surface bearing against the inner wall of said shell, the axial passage and the groove serving as means of circulating a cooling liquid on its way into and out of the shell, respectively.

MATTHEW DOBKOWSKI.